UNITED STATES PATENT OFFICE.

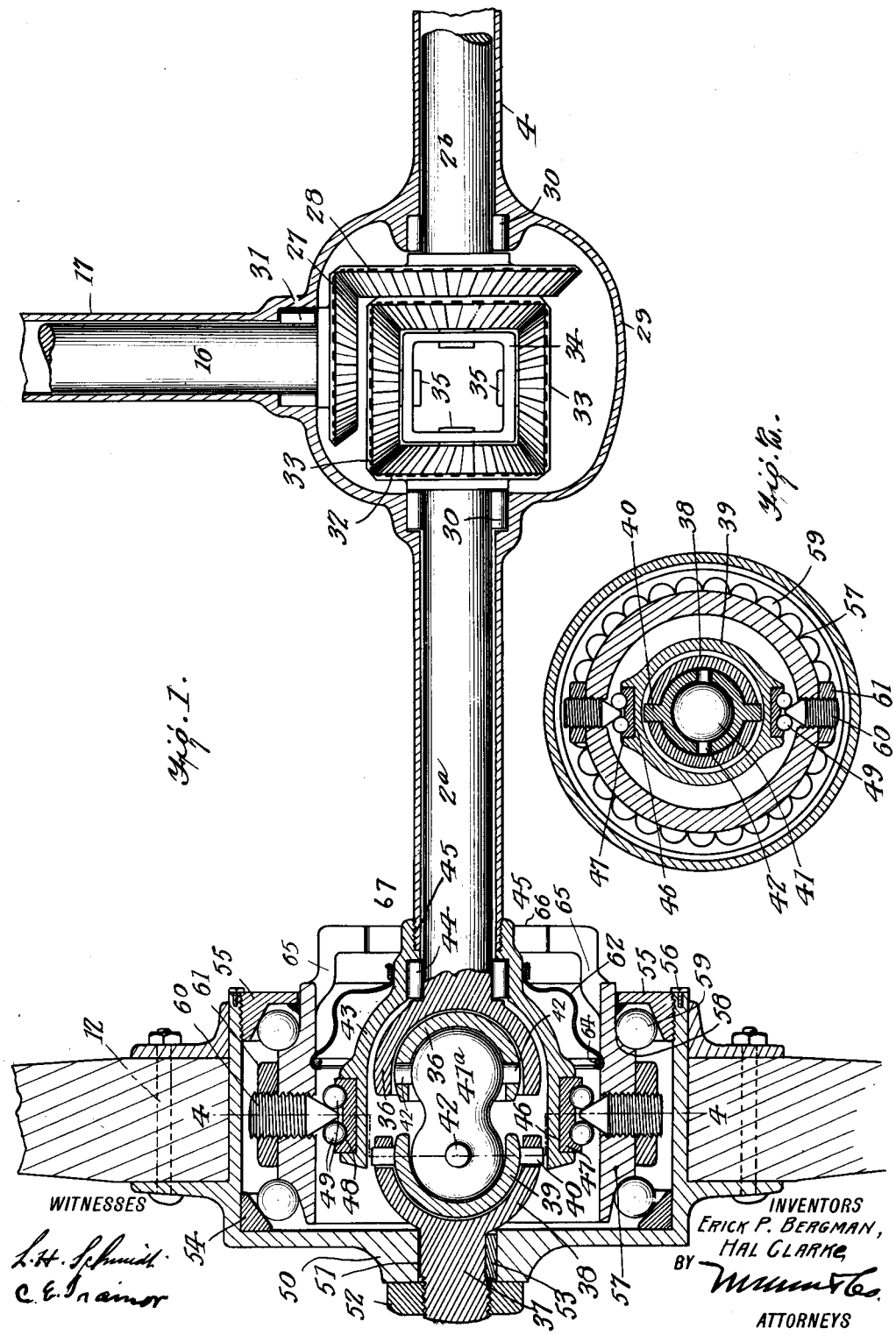

ERICK P. BERGMAN AND HAL CLARKE, OF CHEROKEE, OKLAHOMA, ASSIGNORS OF ONE-EIGHTH TO SYDNEY R. ROTH, OF CHEROKEE, OKLAHOMA, AND ONE-EIGHTH TO RUSSELL N. McCONNELL, OF OKLAHOMA, OKLAHOMA.

FOUR-WHEEL DRIVE.

1,034,956.  Specification of Letters Patent.  Patented Aug. 6, 1912.

Application filed May 10, 1911. Serial No. 626,269.

*To all whom it may concern:*

Be it known that we, ERICK P. BERGMAN and HAL CLARKE, citizens of the United States, and residents of Cherokee, county of Alfalfa, and State of Oklahoma, have invented certain new and useful Improvements in Four-Wheel Drives, of which the following is a specification.

Our invention is an improvement in four wheel drive mechanism, and has for its object the provision of a simple mechanism of the character specified, by means of which power may be applied directly to each of the wheels of a vehicle, without interfering with the turning of the vehicle.

In the drawings, Figure 1 is an enlarged longitudinal section of one end of the front axle, and Fig. 2 is a section on the line 4—4 of Fig. 1.

In the present embodiment of the invention, the connection between the motor which may be of any suitable construction, and the axles is the same for each axle, and but one connection will be described. The connection in each case is made by means of a drive shaft 16, journaled in a housing 17, and each axle is composed of two alined sections 2ª and 2ᵇ, the said sections being spaced apart at their inner edges as shown in Fig. 1. Each section is journaled in a housing 4, and at the meeting ends of the sections, the housing is enlarged as indicated at 29. A roller bearing 30 is provided between each end of the housing and the adjacent axle section and the sections are connected by a differential gearing. The end of the shaft 16 adjacent to the housing 29 is also provided with a roller bearing 31.

Each shaft section has secured thereto a bevel gear 32, and the gears 32 are connected by oppositely arranged gears 33. A substantially rectangular frame 34 is arranged between the gears, and each gear 32 and 33 is provided with a stub shaft 35, which is journaled in the frame. The gear wheel 28 is secured to the section 2ᵇ of the shaft and is of larger diameter.

The outer end of each section of the axle is provided with a socket 36, and a spindle 37 is arranged in alinement with the section, the said spindle having a similar socket 38 on its inner end. A shell, lining or bushing 39 is arranged in each socket, and each lining is provided with oppositely arranged trunnions 40, which are received in openings 41 in the walls of the socket. A link 41ª of dumb-bell shape connects the spindle to the axle section. The said link is enlarged into a ball at each end, and each ball is received in the adjacent lining 36 or 39, and is provided with oppositely extending trunnions 42, engaging openings in the shell 36 or 39.

A bell shaped extension or housing 43 is connected with the adjacent end of the housing 4 and extends outwardly beyond the inner edge of the socket 38. The extension is threaded onto the housing 4 at its inner end as indicated at 45, and a roller bearing 44 is provided between the axle and the extension. The extension is provided with oppositely arranged recesses 46 near its free edge, and a plate 47 is seated in each recess. Each plate 47 is recessed on its upper face, and is provided in the recess with four ball seats 48, for receiving balls 49. The hub 50 of the adjacent wheel 12 is open on the inner face of the wheel, but is closed in the outer face with the exception of a central opening 51, for permitting the passage of the spindle 37. A nut 52 is threaded onto the spindle outside of the wheel. The hub is keyed to the spindle by a key 53. A beveled ring 54 is seated in the bore of the hub at its outer end, and a similar oppositely beveled ring 55 is threaded into the inner end of the bore, and is held from displacement by screws 56, engaging the hub, the heads of the screws lapping on the face of the ring.

A bearing sleeve 57 is arranged within the hub, and each side of the peripheral surface of the sleeve is provided with a groove 58, coöperating with the adjacent ring 54 or 55 to form a ball race, for receiving a series of balls 59. A pointed screw 60 is threaded through the sleeve adjacent to each plate 57, and each screw is locked by a nut 61. Each screw 60 engages the four balls to the plate with its point, and the said screws lock the bearing sleeve to the housing extension. The key 53 locks the hub and wheel to the spindle, and the link 41ª and connected parts, constrains the spindle to rotate with the axle section.

A dust cap 62 is arranged inside the sleeve 57, and between the same and the housing extension 43. A resilient ring 63 encircles the cap at its inner end and clamps it on the housing, and a resilient ring 64 presses the outer end of the cap into contact with the inner face of the bearing sleeve. The cap is annularly flanged at each end, outside of the ring.

The sleeve 57 is provided with oppositely arranged inwardly extending lugs 65, and the lugs are integral with the arms 66 of a yoke, whose body portion 67 may be engaged with suitable steering means for swinging the wheel.

The points of the screws 60 are at the exact center of the link 41ª and the wheel swings on the said screws, in steering the vehicle. Since the screws are mounted in ball bearings, the steering is extremely easy, the wheels moving with a minimum of friction.

We claim:

1. In an automobile or like vehicle, an axle provided at each end with a socket, a spindle at each end of the axle, each spindle having a socket at its inner end, a lining for each socket provided with oppositely arranged trunnions, the socket having openings for receiving the trunnions, a link connecting the linings, said link having a ball at each end provided with oppositely arranged trunnions, the lining having openings for the trunnions, a bell-shaped extension connected with the outer end of the axle housing and extending beyond the inner edge of the spindle socket, a bearing sleeve encircling the extension and spaced apart radially therefrom, oppositely arranged bearing plates supported by the extension, each plate having ball seats, a pointed screw threaded through the bearing sleeve adjacent to each plate, and at the center thereof, balls in the seats engaging the point of the screw, a wheel secured to each spindle, the hub of the wheel inclosing the bearing sleeve, and a ball bearing between the sleeve and the hub.

2. In an automobile, an axle provided at each end with a socket, a housing for the axle, a spindle at each end of the axle, each spindle having a socket at its inner end, a lining for each socket, each lining having oppositely arranged trunnions, and each socket having openings for receiving the trunnions, a link having a ball at each end provided with oppositely arranged trunnions received in the adjacent lining, the lining having openings for the trunnions, a bell shaped extension connected with the outer end of the axle housing and extending over the socket of the spindle, a wheel having a hub closed at its outer end and inclosing the extension, a bearing ring encircling the extension within the hub, the hub being journaled on the ring, oppositely arranged pointed screws threaded through the ring and engaging the extension, a sleeve of flexible material between the inner end of the extension and the inner surface of the ring, a resilient ring encircling the inner end of the extension and the inner end of the sleeve, and a resilient ring arranged within the bearing ring and engaging the outer end of the sleeve.

ERICK P. BERGMAN.
HAL CLARKE.

Witnesses:
JAMES FRED FISHER,
C. HOWARD BAKER.